United States Patent
Pellegrini

(10) Patent No.: US 9,364,012 B2
(45) Date of Patent: Jun. 14, 2016

(54) METHOD FOR AGING COFFEE

(71) Applicant: James Jude Pellegrini, Cary, NC (US)

(72) Inventor: James Jude Pellegrini, Cary, NC (US)

( * ) Notice: Subject to any disclaimer, the term of this patent is extended or adjusted under 35 U.S.C. 154(b) by 139 days.

(21) Appl. No.: 14/039,704

(22) Filed: Sep. 27, 2013

(65) Prior Publication Data

US 2015/0093491 A1    Apr. 2, 2015

(51) Int. Cl.
| | |
|---|---|
| A23F 5/02 | (2006.01) |
| A23F 5/00 | (2006.01) |
| A23F 5/08 | (2006.01) |
| A23F 5/10 | (2006.01) |
| A23F 5/46 | (2006.01) |

(52) U.S. Cl.
CPC ... *A23F 5/02* (2013.01); *A23F 5/00* (2013.01); *A23F 5/08* (2013.01); *A23F 5/10* (2013.01); *A23F 5/465* (2013.01)

(58) Field of Classification Search
CPC .............. A23F 5/00; A23F 5/02; A23F 5/08; A23F 5/10; A23F 2200/00
See application file for complete search history.

(56) References Cited

U.S. PATENT DOCUMENTS

| | | |
|---|---|---|
| 201,848 A | 3/1878 | Stowman |
| 483,313 A | 10/1893 | Cirlo Mingo |
| 660,602 A | 10/1900 | Timby |
| 1,822,227 A | 9/1931 | Lendrich |
| 2,037,037 A | 4/1936 | Moore |
| 2,097,591 A | 11/1937 | Finley |
| 2,444,217 A | 6/1948 | Armentrout |
| 2,725,299 A | 11/1955 | Platel |
| 3,767,418 A | 10/1973 | Ponzoni |
| 4,671,964 A | 6/1987 | Davidescu |
| 4,938,979 A | 7/1990 | Belville |
| 4,985,271 A | 1/1991 | Neilson |
| 5,114,731 A | 5/1992 | Belville |
| 5,478,592 A | 12/1995 | Kingsley |
| 7,713,567 B2 | 5/2010 | Young |
| 2008/0057162 A1 * | 3/2008 | Brucker et al. ................. 426/73 |
| 2012/0244254 A1 | 9/2012 | Takahashi |

FOREIGN PATENT DOCUMENTS

JP    04040874    *    2/1992

OTHER PUBLICATIONS

Jamie Ferguson, Review: Oak Barrel Aged Sumatra From Water Avenue Coffee, The Coffee Adventures, Mar. 31, 2011, published at: http://thecoffeeadventures.com/review-oak-barrel-aged-sumatra-from-water-avenue-coffee/.

Mcilhenny Co., How We Make Original Red Sauce, Tabasco Website, Retrieved Aug. 25, 2013, published at: http://www.tabasco.com/tabasco-products/how-its-made/making-original-tabasco-sauce/.

Bonlife Coffee Co., Tennessee Whiskey Barrel Aged Coffee, BonLife Coffee Website, Retrieved Aug. 25, 2013, published at: http://bonlifecoffee.com/shop/roasted-coffees/tennessee-whisky-barrel-aged-coffee/.

(Continued)

*Primary Examiner* — Anthony Weier
(74) *Attorney, Agent, or Firm* — Colin R. Crossman

(57) ABSTRACT

A method and apparatus for aging coffee, which both accelerates the aging process, and also imparts and develops a desired flavor profile in the finished (roasted and brewed) bean. Beneficial results are obtained by placing unroasted coffee in intimate contact with or in proximity to aging compounds of interest.

13 Claims, 1 Drawing Sheet

(56) References Cited

OTHER PUBLICATIONS

Jon Graef, Dark Matter Coffee Serves Up Bourbon Barrel-Aged Coffee, Chicagoist, Aug. 24, 2013, published at: http://chicagoist.com/2013/08/24/dark_matter_coffee_brews_up_bourbon.php.

Kim Bellware, Dark Matter Debuts Bourbon Barrel Aged Coffee to Kick Off Their Boozy, Buzzing Experiment, Huffington Post, Aug. 13, 2013, published at: http://www.huffingtonpost.com/2013/08/13/bourbon-barrel-aged-coffe_n_3750405.html.

* cited by examiner

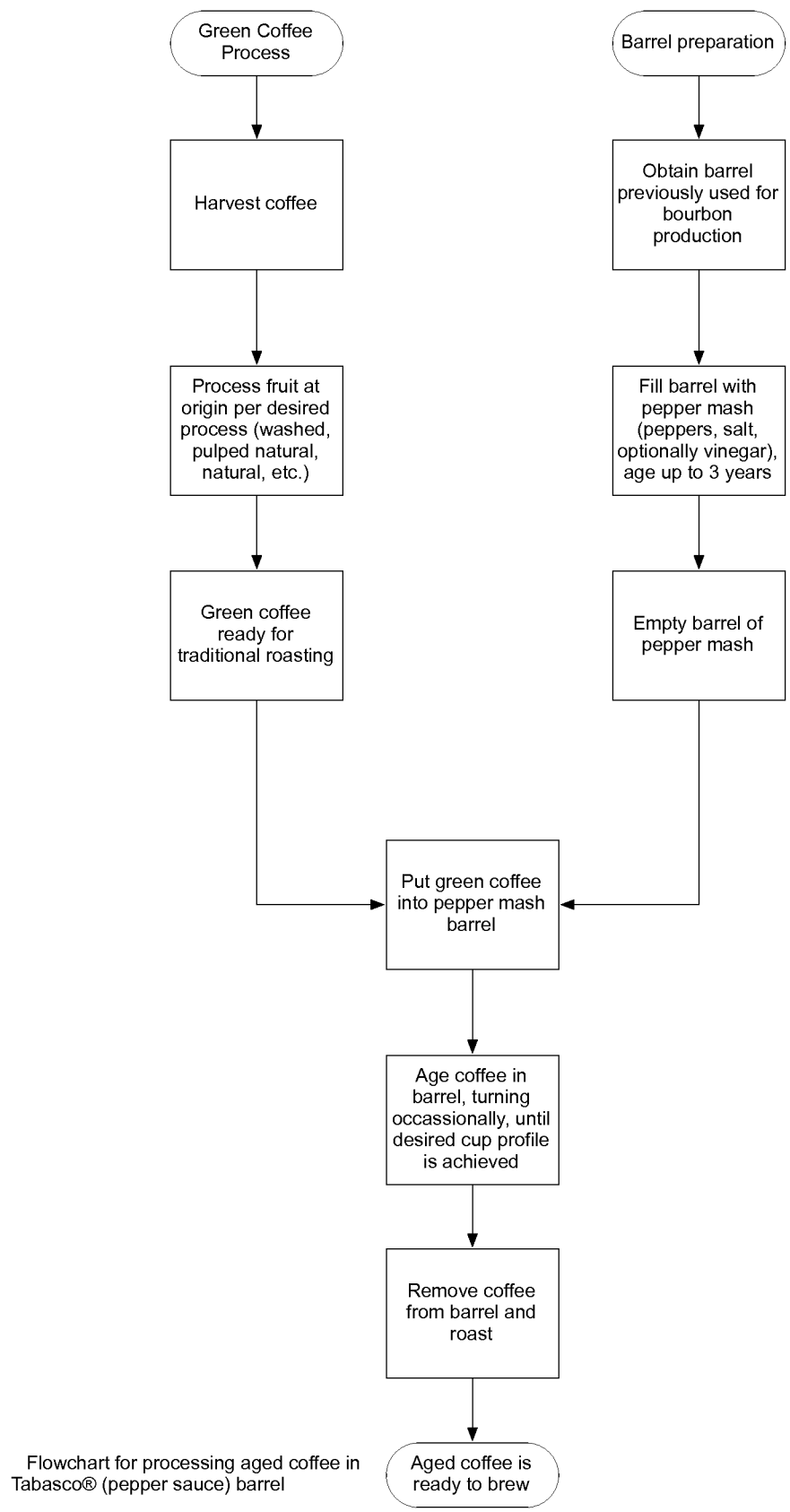
Flowchart for processing aged coffee in Tabasco® (pepper sauce) barrel

METHOD FOR AGING COFFEE

CROSS-REFERENCES TO RELATED APPLICATIONS

This application is related to U.S. Provisional Patent Application No. 61/644,896 filed Oct. 5, 2012, and claims the priority date of that provisional patent application. The aforementioned provisional application is incorporated by reference herein for all purposes.

STATEMENT REGARDING FEDERALLY SPONSORED RESEARCH OR DEVELOPMENT

Not Applicable.

SEQUENCE LISTING APPENDIX

Not Applicable.

FIELD OF THE INVENTION

This invention relates to aging of unroasted coffee beans.

BACKGROUND OF THE INVENTION

Unroasted, or green, coffee beans have long been "aged" to alter their flavor profile in ways desirable to many coffee consumers. It is theorized that various aging processes in use today were developed to mimic conditions experienced by beans transported via wooden sailing ships. Because the transit time was long, and the holds of the ship permeable, the beans would "weather" in the holds of the ship, altering their flavor in ways which consumers at the destination came to enjoy.

As shipping practices steadily improved, coffee beans no longer aged in the way they previously did. Some of this change is due to the incorporation of different materials in the actual shipping containers and the ships themselves, such as the transition from wooden hulls to steel. Other aspects of this change is due simply to the development of more advanced propulsion systems, dramatically reducing transit times. In response to consumer demand for the flavor profiles represented by the sea-aged coffees, alternative methodolgies were developed to age or weather the beans at origin prior to shipping.

Coffee is also aged for economic reasons. When prices are low, coffee will be put up for aging, with the hope that when the aging is complete, prices will be higher. During years of high prices, little or no coffee may be aged, causing a shortage of aged coffee in the marketplace and in subsequent years.

Methods in use today in places such as India and Indonesia are, essentially, land-based methods that cause the beans to experience conditions similar to what beans transported via wooden sailing ship experienced.

One method of aging consists of placing beans in jute sacks, stacking them in a structure with a roof but otherwise largley open to the weather, e.g., no or minimal walls. The stacks are periodically broken down and rearranged to assure that all sacks are equally exposed to the elements.

Another aging method, especially popular in India for producing the coffee known as "Monsooned Malabar", involves trucking green coffee to coastal regions (in the case of India, the Malabar Coast) during rainy (Monsoon) season. The coffees are spread on patios in large buildings that have roofs, but large wall openings draped with jute "curtains". Moist monsoon winds are allowed to wash over the beans, which are frequently raked and monitored to determine rate of moisture uptakes. The jute curtains are used to control the exposure, and in the event exposure is more than desired, the bean are rebagged temporaily, then returned to the monsooning patios until the desired finish conditions are achieved.

Aging coffees via these methods can require many months or even years of processing time. During the process, the coffees are susceptible to spoilage via mold, mildew or damage from pests. Because of the risks inherent in these methods, it is not unusual for less desirable raw inputs to be used.

Both methods result in a similar final product. The aged beans, when roasted, have flavors of earth and minerals, and often vegetal character. Most distinctively, they tend to have a "mellow" cup character that is noteworthy for its lack of acidity-aged coffees can be described as "flat".

Recently, a few coffee roasters have taken note of aging methodologies used in the wine and spirits industry, specifically cask aging, whereby the product of interest is placed in a wooden barrel for a time to impart unique flavor characteristics. In many cases, the desired effect is a "woody" flavor profile. In some cases, used, charred spirit barrels (e.g., whiskey) are used to impart deeper, smokier flavor. These methods, like the older ones before them, take a long time (many months to years) and result in coffees with low acidity in the cup.

The methods described have several shortcomings. In the case of coffees exposed to weather, the chance of spoilage or other loss is a significant drawback. Naturally weathered coffees are also subject to variability in the character of the finished batches, a disadvantage in a market where consumers desire predictable flavor profiles. In all cases, the length of time required to age the coffees is undesirable. Finally, and perhaps most importantly, the "flat" cup profile is an undesirable, and until now, unavoidable characteristic of aged coffees. This fact is evidenced by the methodologies used to grade coffees for establishing their market value. Acidity is a desirable characteristic that warrants its own category in every major scoring methodology, e.g., the Specialty Coffee Association of America (SCAA) Cupping Protocol. Coffees with higher acidity are awarded more points than coffees with low acidity, and accordingly suffer in terms of market value. Traditional processes also lack relationships to brands popular with consumers, and the ability to market the resulting coffee in connection with a brand.

SUMMARY OF THE INVENTION

The invention disclosed herein is a method for cask-aging coffees in a manner which speeds the process, while enhancing the acidity of the finished product. This method of coffee aging is a cask-aging methodology, but one that utilizes a very unique cask. The novel result when using this cask-aging process is more rapid aging of the coffee, and a more desirable flavor profile, specifically a higher acid content than traditional aged coffee, and pepper flavors may be detected in the finish.

BRIEF DESCRIPTION OF THE DRAWINGS

FIG. 1 shows a flowchart of the process.

DETAILED DESCRIPTION OF THE PRESENT INVENTION

The cask, or barrel, used for coffee aging in this disclosure is a wooden cask, or barrel, that would be typically seen in the production of wine or whiskey. The casks are preferably made from oak wood, but other woods such as maple, chestnut, redwood, cedar, mesquite, or any other wood suitable for contact with food products may be used to produce different flavor characteristics.

During construction, the cask is preferably toasted or charred. This process results in an interior surface char, but does not negatively impact the structural integrity of the barrel. While the present invention preferably contemplates using charred barrels, un-charred barrels are also an option, which produce different flavor characteristics.

A new, previously unused, charred, cask is initially prepared by using said cask in the production of wine or spirituous liquor, preferably the spirituous liquor known as bourbon whiskey. Other spirituous liquors are also aged in barrels, such as scotch, tequila and rum, to name a few. In addition, wine is also commonly aged in barrels. The selection of a first preparatory spirituous liquor or wine will impact the final flavor profile.

Following the use of the cask in the production of wine or spirituous liquor, the cask is further prepared through the production of barrel-aged peppers. While there are many methods of aging peppers in barrels, the preferred embodiment utilizes the aging practices of the particular aged-pepper sauce known as Tabasco®.

In general, the curing of peppers follows the following procedure. Peppers, ideally *Capsicum frutescens* peppers, the peppers may previously have been pickled, and placed in the cask. The peppers are placed in the cask either whole, sliced, or preferably as a mash, and preferably with a quantity of salt.

The Tabasco® process for curing peppers is relatively straightforward. It starts with obtaining a used bourbon barrel (oak, charred). The barrel is filled with peppers and salt, and then aged approximately three years. After the approporiate salt-aging period is elapsed, vinegar is added to the mash, and the process goes on another six months. After the contents are emptied, the barrel is ready for aging coffee.

While it is contemplated that casks used in the manufacture of Tabasco® pepper sauce are the preferred mode of this invention, it is contemplated that other modes can be used to achieve the same end product. The used casks of other manufacturers of aged pepper sauce, for instance, Frank's Red Hot®, among others, could be used in place of Tabasco® casks, to produce a slightly different flavor.

It is further contemplated that the casks could be prepared by skipping the aging of wine or spirituous liquor, and proceeding to the aging of peppers.

It is further contemplated that the casks could be prepared by the aging of a custom-made or commercially available hot sauce product. In this embodiment, a cask (charred or uncharred; and previously used for the aging of wine or spirituous liquor or not) is filled with a quantity of one or more commercially available pepper sauce products, or filled with one or more custom made pepper sauce products, or a blend thereof. The cask is allowed to age for a time of at least 1 day.

To age the coffee, green (unroasted) coffee beans are added to the barrel through the bung hole, and the barrel is sealed. The barrel is rotated periodically (approximately monthly) to allow the beans to contact the surface of the barrel. After at least 20 days, but preferably 200 days, the coffee is sufficiently aged, although longer aging is not detrimental.

See FIG. 1 for a flowchart of the process.

There are two unique aspects to this process: first, the coffee age more rapidly than traditional processes; and second, the resulting cup taste profile experiences no reduction in acidity from the green state, in fact, the acidity is believed to be enhanced.

These desirable outcomes are attributable to the remmants of pepper sauce in the barrel, particularly salt and capsicum. It is possible that other vessels could yield similar results due to residuals from other processes, e.g., pickling.

Similar results could be achieved by placing the coffee in an inert vessel, and placing objects impregnated with the desireable substances into intimate contact with the coffee. For example, wooden staves soaked in salt, vinegar and capsicum would have the same effect in an inert vessel as they would in the case where the vessel itself is impregnated, as in the case of the Tabasco® barrel. Wooden staves could also be prepared by impregnating the staves with a pepper sauce product.

Furthermore, the similar results could be achieved by spraying the compounds of interest directly onto the green coffee.

Single-serve coffee brewing systems, such as K-Cups®, Nespresso®, and others, additionally present an area where the present invention can be applied.

Lastly, a pepper-sauce product, such as Tabasco® pepper sauce, could be freeze-dried and an amount included with roasted coffee, either ground or not, to impart similar flavors and/or enhance flavors in the roasted coffee.

I claim:

1. A method for aging unroasted coffee beans, comprising:
   a. Contacting green coffee beans with wood previously used in the aging of peppers or pepper sauce, the wood comprising:
      salt;
      vinegar; and
      capsicum; and
   b. Maintaining said contact for a period of time of at least 20 days, such that an acidity content of the green coffee beans is increased from a first acidity content to a second acidity content.

2. The method of claim 1, wherein the wood previously used in the aging of peppers or pepper sauce was used in the manufacture of wine or spirituous liquor prior to the aging of peppers or pepper sauce.

3. The method of claim 1, wherein the wood previously used in the aging of peppers or pepper sauce was used in the manufacture of Tabasco® sauce.

4. The method of claim 1, further comprising:
   c. Roasting the coffee beans after maintaining said contact for the period of time;
   d. Grinding the coffee beans after roasting the coffee beans to produce coffee grounds; and
   e. Providing the coffee grounds in a package suitable for a single-serving coffee maker.

5. The method of claim 1, wherein the wood previously used in the aging of peppers or pepper sauce was in contact with the peppers or pepper sauce during the aging of the peppers or pepper sauce.

6. The method of claim 1, wherein the wood previously used in the aging of peppers or pepper sauce was used in the manufacture of pepper sauce.

7. The method of claim 1, wherein contacting green coffee beans with wood previously used in the aging of peppers or pepper sauce comprises storing the green coffee beans in a wood barrel previously used to store peppers in contact with the wood barrel.

8. The method of claim 7, wherein the wood barrel previously used to store peppers in contact with the wood barrel is a wood barrel used to store peppers in the manufacture of pepper sauce.

9. The method of claim 7, wherein the wood barrel previously used to store peppers in contact with the wood barrel is a wood barrel used to store peppers in the manufacture of Tabasco® sauce.

10. The method of claim 1, wherein the peppers or pepper sauce are peppers used in the manufacture of pepper sauce, and wherein the wood was in contact with the peppers used in the manufacture of the pepper sauce during the manufacture of the pepper sauce.

11. The method of claim 3, wherein the peppers or pepper sauce are peppers used in the manufacture of the Tabasco® sauce, and wherein the wood previously used in the manufacture of the Tabasco® sauce was in contact with the peppers used in the manufacture of the Tabasco® sauce during the manufacture of the Tabasco® sauce.

12. The method of claim 1, wherein the wood previously used in the aging of peppers or pepper sauce is oak.

13. The method of claim 8, wherein, prior to contacting the green coffee beans, an interior of the wood barrel was:
- charred;
- placed in contact with bourbon whiskey for a first predetermined period of time;
- placed in contact with a mash for a second predetermined period of time, the mash comprising:
  - *Capsicum frutescens* peppers; and
  - salt; and
- placed in contact with a mixture of the mash and vinegar for a third predetermined period of time.

\* \* \* \* \*